(12) United States Patent
Sambhwani et al.

(10) Patent No.: US 8,965,426 B2
(45) Date of Patent: Feb. 24, 2015

(54) METHOD AND APPARATUS FOR INTERCELL UPLINK INTERFERENCE CONTROL

(75) Inventors: Sharad Deepak Sambhwani, San Diego, CA (US); Venkata Ramanan Venkatachalam Jayaraman, San Diego, CA (US); Siddharth Mohan, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 13/396,246

(22) Filed: Feb. 14, 2012

(65) Prior Publication Data

US 2012/0220324 A1 Aug. 30, 2012

Related U.S. Application Data

(60) Provisional application No. 61/442,663, filed on Feb. 14, 2011, provisional application No. 61/556,587, filed on Nov. 7, 2011.

(51) Int. Cl.
*H04B 7/00* (2006.01)
*H04W 28/04* (2009.01)
(Continued)

(52) U.S. Cl.
CPC .......... *H04W 28/048* (2013.01); *H04W 52/243* (2013.01); *H04W 8/26* (2013.01); *H04W 48/16* (2013.01); *H04W 52/146* (2013.01); *H04W 52/40* (2013.01); *H04W 72/042* (2013.01)
USPC ........... 455/501; 455/504; 455/442; 455/507; 455/515; 455/436

(58) Field of Classification Search
USPC .................. 455/501, 504, 442, 507, 515, 436
See application file for complete search history.

(56) References Cited

U.S. PATENT DOCUMENTS 6,263,205 B1 7/2001 Yamaura et al.
2005/0020273 A1* 1/2005 Fong et al. .................... 455/453
(Continued)

FOREIGN PATENT DOCUMENTS

EP 1708523 A1 10/2006
JP H11313356 A 11/1999
(Continued)

OTHER PUBLICATIONS

Ericsson: "E-DCH interference in CELL_FACH", 3GPP Draft; R2-081812 Interferenceeul, 3rd Generation Partnership Project (3GPP), Mobile Competence Centre ; 650. Route Des Lucioles ; F-06921 Sophia-Antipolis Cedex ; France, vol. RAN WG2, No. Shenzhen, China; 20080325, Mar. 25, 2008, XP050139509, [retrieved on Mar. 25, 2008].

(Continued)

*Primary Examiner* — Sanh Phu

(57) ABSTRACT

Wireless user equipment (UE) operating in a wireless communication system may operate in a state, for example, the CELL_FACH state in UMTS, that does not allow for soft handoff from one cell to another. This inability to engage in soft handover may lead to intercell interference at a non-serving cell when the UE transmits on its uplink in close proximity to the non-serving cell. Therefore, provided in the present disclosure is method of wireless communication, which includes receiving a neighbor cell identification set indicating one or more neighbor cells, receiving a relative grant channel resource index corresponding to a relative grant channel shared by at least one of the one or more neighbor cells, detecting intercell interference associated with a user equipment (UE) in the one or more neighbor cells, and transmitting a non-serving relative grant message to the UE on the relative grant channel.

38 Claims, 12 Drawing Sheets

(51) Int. Cl.
*H04W 52/24* (2009.01)
*H04W 8/26* (2009.01)
*H04W 48/16* (2009.01)
*H04W 52/14* (2009.01)
*H04W 52/40* (2009.01)
*H04W 72/04* (2009.01)

(56) References Cited

U.S. PATENT DOCUMENTS

| | | | |
|---|---|---|---|
| 2008/0254804 A1* | 10/2008 | Lohr et al. | 455/442 |
| 2009/0143016 A1 | 6/2009 | Li | |
| 2009/0219893 A1 | 9/2009 | Korpela et al. | |
| 2009/0247161 A1 | 10/2009 | Pani et al. | |
| 2010/0317350 A1* | 12/2010 | Lee et al. | 455/442 |
| 2011/0021239 A1 | 1/2011 | Wakabayashi et al. | |
| 2011/0044247 A1 | 2/2011 | Luo et al. | |
| 2012/0115522 A1* | 5/2012 | Nama et al. | 455/501 |
| 2013/0045780 A1* | 2/2013 | Castor et al. | 455/574 |

FOREIGN PATENT DOCUMENTS

| | | |
|---|---|---|
| JP | 2006135985 A | 5/2006 |
| JP | 2008535336 A | 8/2008 |
| JP | 2010500793 A | 1/2010 |
| WO | 2006102949 A1 | 10/2006 |
| WO | 2007023351 A2 | 3/2007 |

OTHER PUBLICATIONS

Huawei et al: "Signalling based interference control and time reduction of uplink initial access in CELL_FACH", 3GPP Draft; R1-112982. 3rd Generation Partnership Project (3GPP), Mobile Competence Centre ; 650, Route Des Lucioles ; F-06921 Sophia-Antipolis Cedex ; France, vol. RAN WG1, No. Zhuhai; 20111010, Oct. 4, 2011, XP050538183, [retrieved on Oct. 4, 2011].

International Search Report and Written Opinion—PCT/US2012/025119—ISA/EPO—Jun. 4, 2012.

Qualcomm Europe: "Impact of Inter-cell Interference with EUL in CELL_FACH", 3GPP Draft: R1-080812, 3rd Generation Partnership Project (3GPP), Mobile Competence Centre ; 650, Route Des Lucioles ; F-0691 Sophia-Antipolis Cedex ; France, vol. RAN WG1, No. Sorrento, Italy; 20080206, Feb. 6, 2008, XP050109294, [retrieved on Feb. 6, 2008].

Qualcomm Europe: "Inter-cell Interference Cancellation in CELL_DCH and CELL_FACH", 3GPP Draft; R1-081357. 3rd Generation Partnership Project (3GPP), Mobile Competence Centre ; 650, Route Des Lucioles : F-06921 Sophia-Antipols Cedex ; France, vol. RAN WG1, No. Shenzhen, China; 20080326, Mar. 26, 2008, XP050109781, [retrieved on Mar. 26, 2008].

Qualcomm Incorporated: "Introducing futher enhancements to CELL_FACH operation", 3GPP Draft R2-110890_Intro_Further_ENH_CELL_FACH, 3rd Generation Partnership Project (3GPP), Mobile Competence Centre ; 650, Route Des Lucioles ; F-06921 Sophia-Antipolis Cedex; France, vol. RAN WG2, No. Taipei, Taiwan; 20110221, Feb. 15, 2011, XP050493639, [retrieved on Feb. 15, 2011] p. 14, lines 34-45.

Qualcomm Incorporated: "On the benefits of signaling based Interference control in CELL_FACH", 3GPP Draft R1-112683_on_the_Benefits_of_SIG_Based Int_Control_CELL_FACH, 3rd Generation Partnership Project (3GPP), Mobile Competence Centre ; 650, Route Des Lucioles ; F-06921 Sophia-Antipolis Cedex ; France, vol. RAN WG1, No. Athens, Greece; 20110822, Aug. 19, 2011, XP050537852, [retrieved on Aug. 19, 2011].

Qualcomm Incorporated: "On the benefits of signaling based Interference control in CELL_FACH", 3GPP Draft; R2-112134 on_Benefits_SIG_Based_Int_Control_CELL_FACH, 3rd Generation Partnership Project (3GPP), Mobile Competence Centre ; 650, Route Des Lucioles ; F-06921 Sophia-Antipolis Cedex ; France, vol. RAN WG2 No. Shanghai, China; 20110411, Apr. 5, 2011, XP050494545, [retrieved on Apr. 5, 2011].

Samsung: "Inter-cell Interference Control for Enhanced Uplink in CELL_FACH state", 3GPP Draft: R1_080056_Interference, 3rd Generation Partnership Project (3GPP), Mobile Competence Centre ; 650, Route Des Lucioles : F-06921 Sophia-Antipolis Cedex ; France, vol. RAN WG1, No. Sevilla, Spain; 20080108, Jan. 8, 2008, XP050109120, [retrieved on Jan. 8, 2008].

Shan, Haroon, Comparison of Picocell and DAS Configuration With HSPA Evolution, MS Thesis, Tampere University of Technology, Sep. 2010.

Interdigital, "Inter-cell interference with E-DCH in CELL_FACH," 3GPP TSG-RAN WG1#52bis Tdoc R1-081270, Mar. 26, 2008.

* cited by examiner

METHOD AND APPARATUS FOR INTERCELL UPLINK INTERFERENCE CONTROL

CLAIM OF PRIORITY UNDER 35 U.S.C. §119

The present Application claims priority to Provisional Application No. 61/442,663, entitled "Method of Inter-Cell Uplink Interference Control in CELL_FACH, Flat Architecture and Heterogeneous Networks for HSPA," filed Feb. 14, 2011, and assigned to the assignee hereof and hereby expressly incorporated by reference herein. The present application further claims priority to Provisional Application No. 61/556,587, entitled "Method of Inter-Cell Uplink Interference Control in CELL_FACH, Flat Architecture and Heterogeneous Networks for HSPA," filed Nov. 7, 2011, and assigned to the assignee hereof and hereby expressly incorporated by reference herein.

BACKGROUND

1. Field

Aspects of the present disclosure relate generally to wireless communication systems, and more particularly, to wireless signal interference management.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless networks, such as UMTS networks, user equipment (UE) may operate in several states, two of which are CELL_DCH and CELL_FACH. The CELL_DCH state is characterized by having a dedicated physical channel in the uplink and downlink and the ability to engage in soft handover procedures. UEs in the CELL_FACH state, however, do not have a dedicated physical channel and are unable to engage in soft handover. This lack of ability to engage in soft handover in the CELL_FACH state can potentially lead to uplink interference at a neighbor cell, especially in instances where a high number of UEs in CELL_FACH camp on a serving cell adjacent to the neighbor cell.

Furthermore, cell reselection procedures in CELL_FACH are slow and cumbersome. As a result, when a UE operating in CELL_FACH initiates a transmission on the uplink, the serving cell may not be the strongest cell on the downlink. In the absence of any uplink imbalance between the serving cell and the neighboring strongest downlink cell, the UE uplink transmission may cause interference at the neighbor cell or cells. Additionally, even if the serving cell is the strongest downlink cell, if an uplink to a neighbor cell were stronger than the uplink to the serving cell, an uncontrollable interference condition could exist at the neighbor cell.

This interference phenomenon may also occur in heterogeneous networks, which may include network access devices of various forms, technologies, and network types, such as picocells, femtocells, cellular base stations, macrocells, small cells and the like. In heterogeneous networks, soft handoff may not be available due to the varying technologies of the network access devices and/or cells, so uplink interference may occur where a UE is in CELL_FACH mode on a serving cell near another network access device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide for a method of managing intercell interference, which includes receiving a neighbor cell identification set indicating one or more neighbor cells, receiving a relative grant channel resource index corresponding to a relative grant channel shared by at least one of the one or more neighbor cells, detecting intercell interference associated with a user equipment (UE) in the one or more neighbor cells, and transmitting a non-serving relative grant message to the UE on the relative grant channel.

In a further aspect, the disclosure presents an apparatus for managing intercell interference, which includes means for receiving a neighbor cell identification set indicating one or more neighbor cells, means for receiving a relative grant channel resource index corresponding to a relative grant channel shared by at least one of the one or more neighbor cells, means for detecting intercell interference associated with a user equipment (UE) in the one or more neighbor cells, and means for transmitting a non-serving relative grant message to the UE on the relative grant channel.

Further presented herein is a computer program product for managing intercell interference, which includes a computer-readable medium comprising code for receiving a neighbor cell identification set indicating one or more neighbor cells, receiving a relative grant channel resource index corresponding to a relative grant channel shared by at least one of the one or more neighbor cells, detecting intercell interference associated with a user equipment (UE) in the one or more neighbor cells, transmitting a non-serving relative grant message to the UE on the relative grant channel.

Additionally presented herein is a method of managing intercell interference, which includes determining at a user equipment (UE) whether the UE is in a soft handover region, monitoring a relative grant channel based on the determining, receiving a non-serving relative grant message from a non-serving neighbor cell, and adjusting one or more uplink transmission characteristics based upon the non-serving relative grant message.

Moreover, the present disclosure provides for an apparatus for managing intercell interference, which includes means for determining at a user equipment (UE) whether the UE is in a soft handover region, means for monitoring a relative grant channel based on the determining, means for receiving a non-serving relative grant message from a non-serving neighbor cell, and means for adjusting one or more uplink transmission characteristics based upon the non-serving relative grant message.

Additionally contemplated by the present disclosure is a computer program product for managing intercell interference, which includes a computer-readable medium comprising code for determining at a user equipment (UE) whether the UE is in a soft handover region, monitoring a relative grant channel based on the determining, receiving a non-serving relative grant message from a non-serving neighbor cell, and adjusting one or more uplink transmission characteristics based upon the non-serving relative grant message.

Furthermore, presented herein is an apparatus for managing intercell interference, which includes at least one processor and a memory coupled to the at least one processor, where the at least one processor is configured to determine at a user equipment (UE) whether the UE is in a soft handover region monitor a relative grant channel based on the determining receive a non-serving relative grant message from a non-serving neighbor cell, and adjust one or more uplink transmission characteristics based upon the non-serving relative grant message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
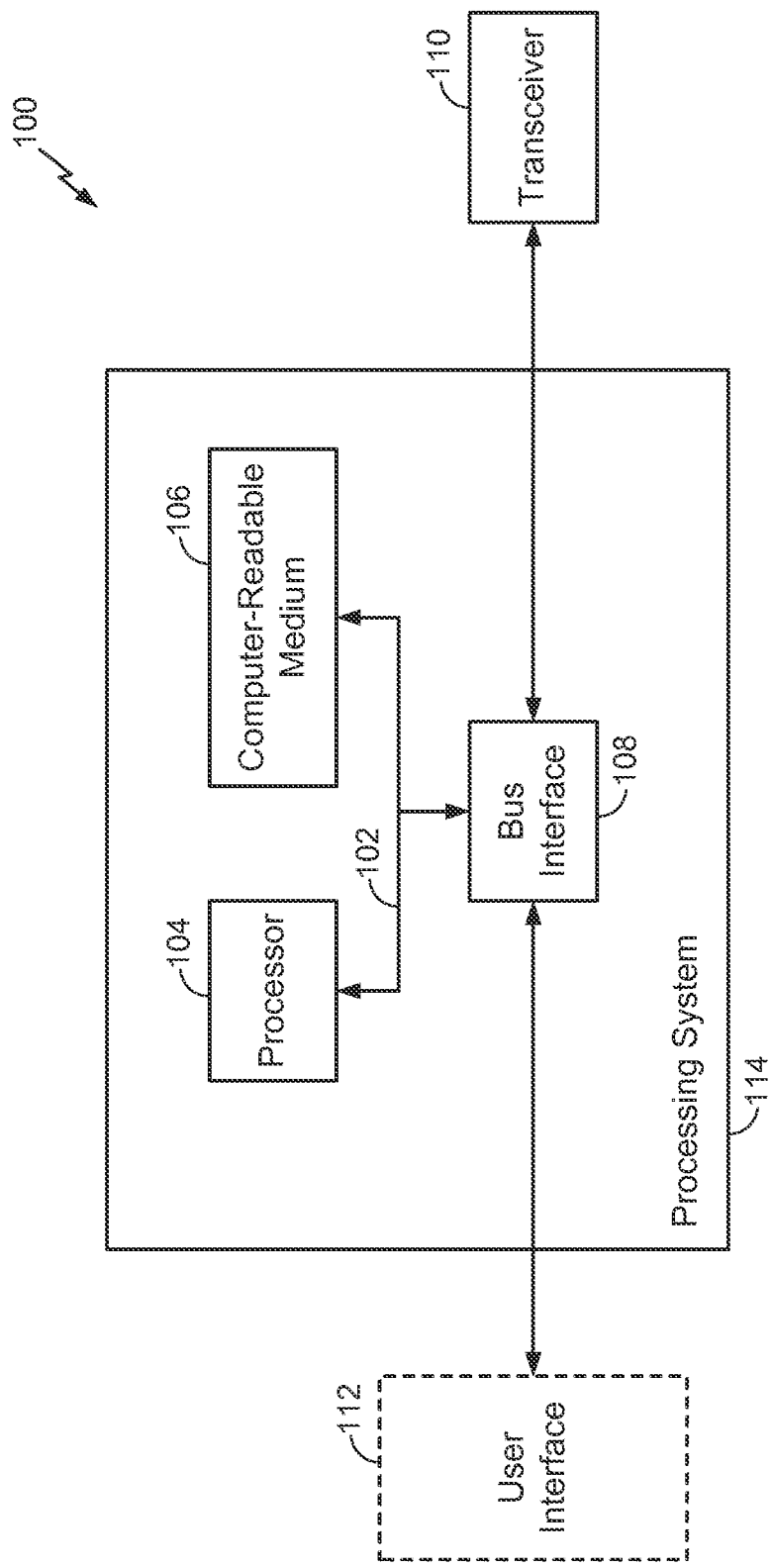
FIG. 1 is a block diagram illustrating an example of a hardware implementation for an apparatus employing a processing system.

FIG. 1 is a block diagram illustrating an example of a hardware implementation for an apparatus 100 employing a processing system 114 configured to perform the interference management functionality described herein. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards. By way of example and without limitation, the aspects of the present disclosure illustrated in FIG. 2 may be configured to perform the interference management functionality described herein and are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 2:
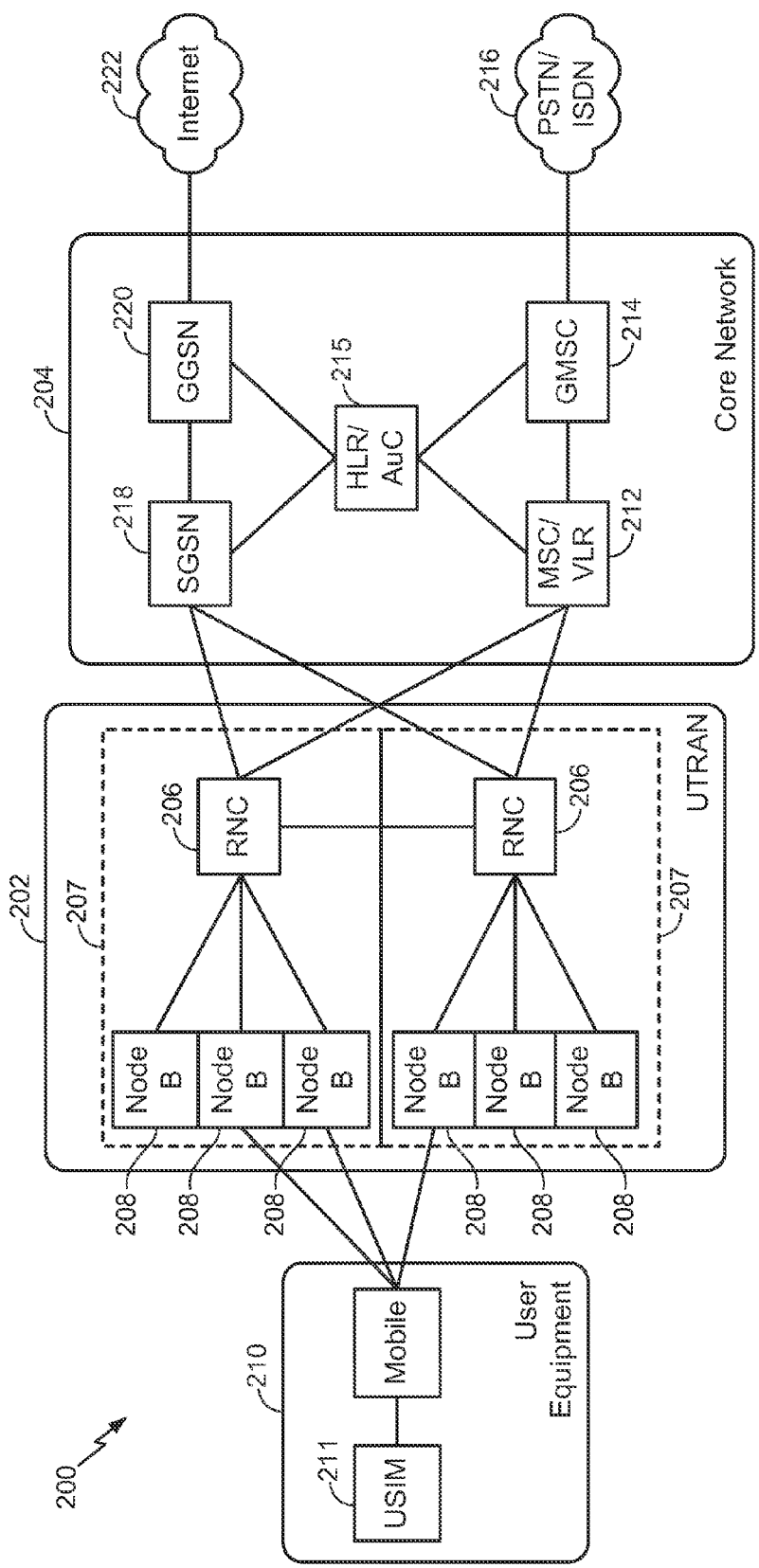
FIG. 2 is a block diagram conceptually illustrating an example of a telecommunications system.
Figure 3:
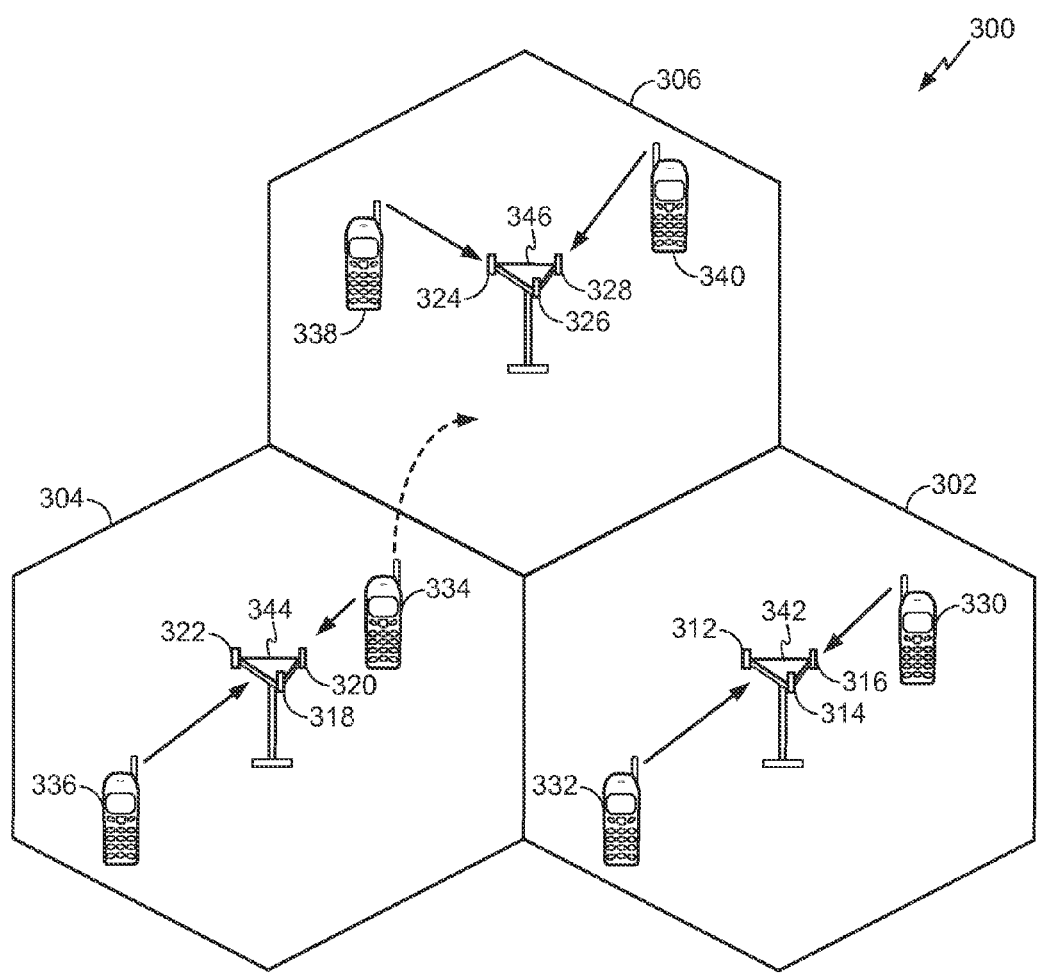
FIG. 3 is a conceptual diagram illustrating an example of an access network.

Referring to FIG. 3, an access network 300 in a UTRAN architecture is illustrated which may be configured to perform the interference management functionality described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighbor cells such as cells 306 and 302. Further, depending on the quality of these parameters, the UE 334 may maintain communication with one or more of the neighbor cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 4:
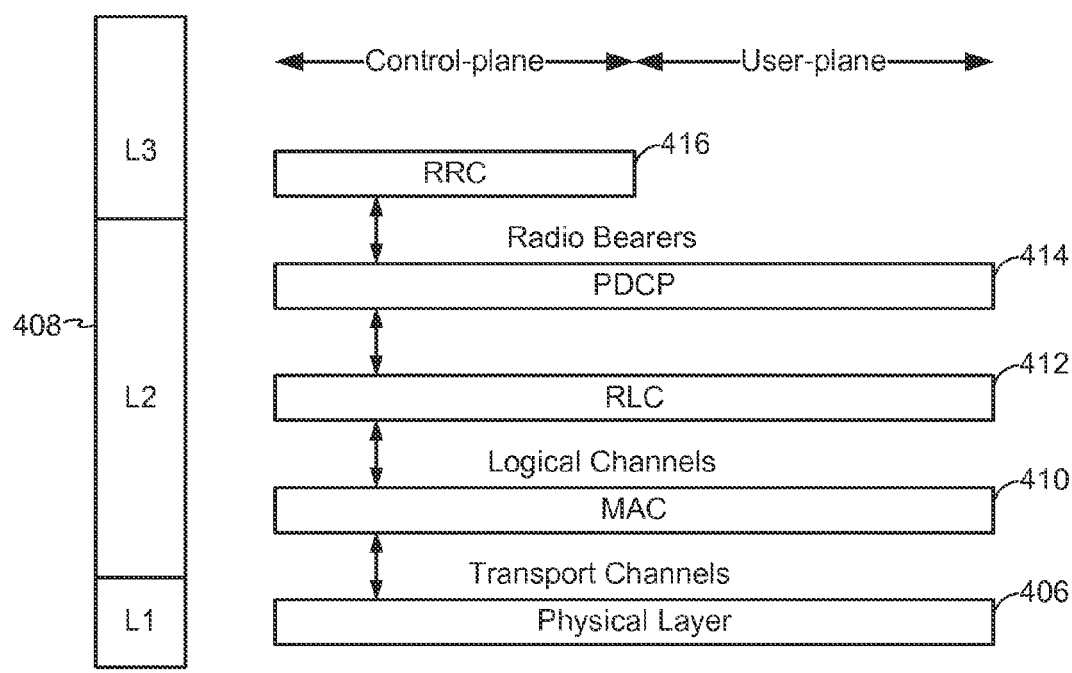
FIG. 4 is a conceptual diagram illustrating an example of a radio protocol architecture for the user and control plane.

The radio protocol architecture may take on various forms depending on the particular application. An example for an HSPA system will now be presented with reference to FIG. 4. FIG. 4 is a conceptual diagram illustrating an example of the radio protocol architecture for the user and control planes.

Turning to FIG. 4, the radio protocol architecture for the UE and node B is shown with three layers: Layer 1, Layer 2, and Layer 3. This radio protocol architecture may be configured to perform the interference management functionality described herein through application and signal management on, for example, a processor, memory, or communications module located in the UE or node B. Layer 1 is the lowest lower and implements various physical layer signal processing functions. Layer 1 will be referred to herein as the physical layer 406. Layer 2 (L2 layer) 408 is above the physical layer 406 and is responsible for the link between the UE and node B over the physical layer 406.

In the user plane, the L2 layer 408 includes a media access control (MAC) sublayer 410, a radio link control (RLC) sublayer 412, and a packet data convergence protocol (PDCP) 414 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Figure 5:
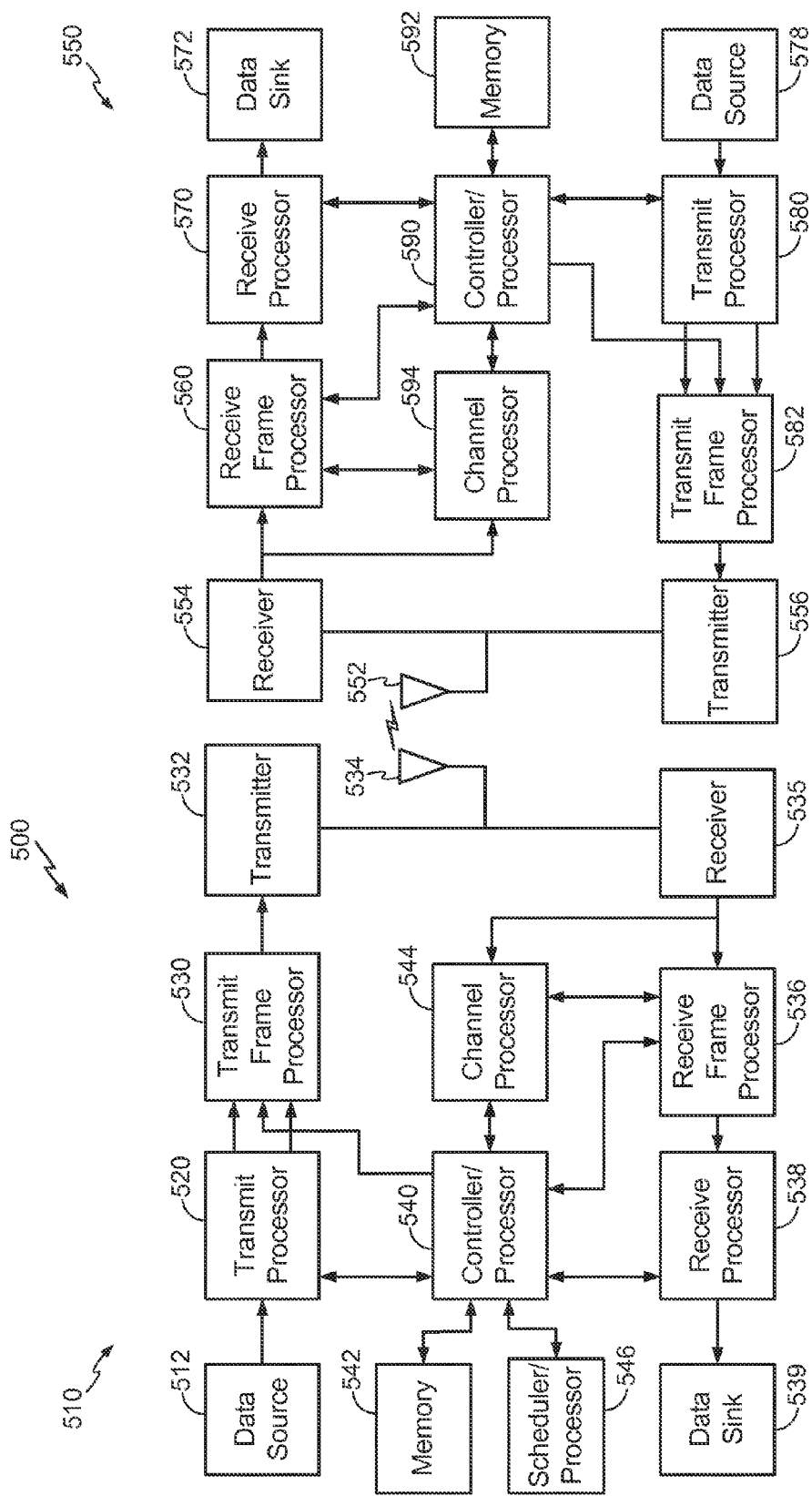
FIG. 5 is a block diagram conceptually illustrating an example of a Node B in communication with a UE in a telecommunications system.

FIG. 5 is a block diagram of a Node B 510 in communication with a UE 550, where the Node B 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSF's, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Figure 6:
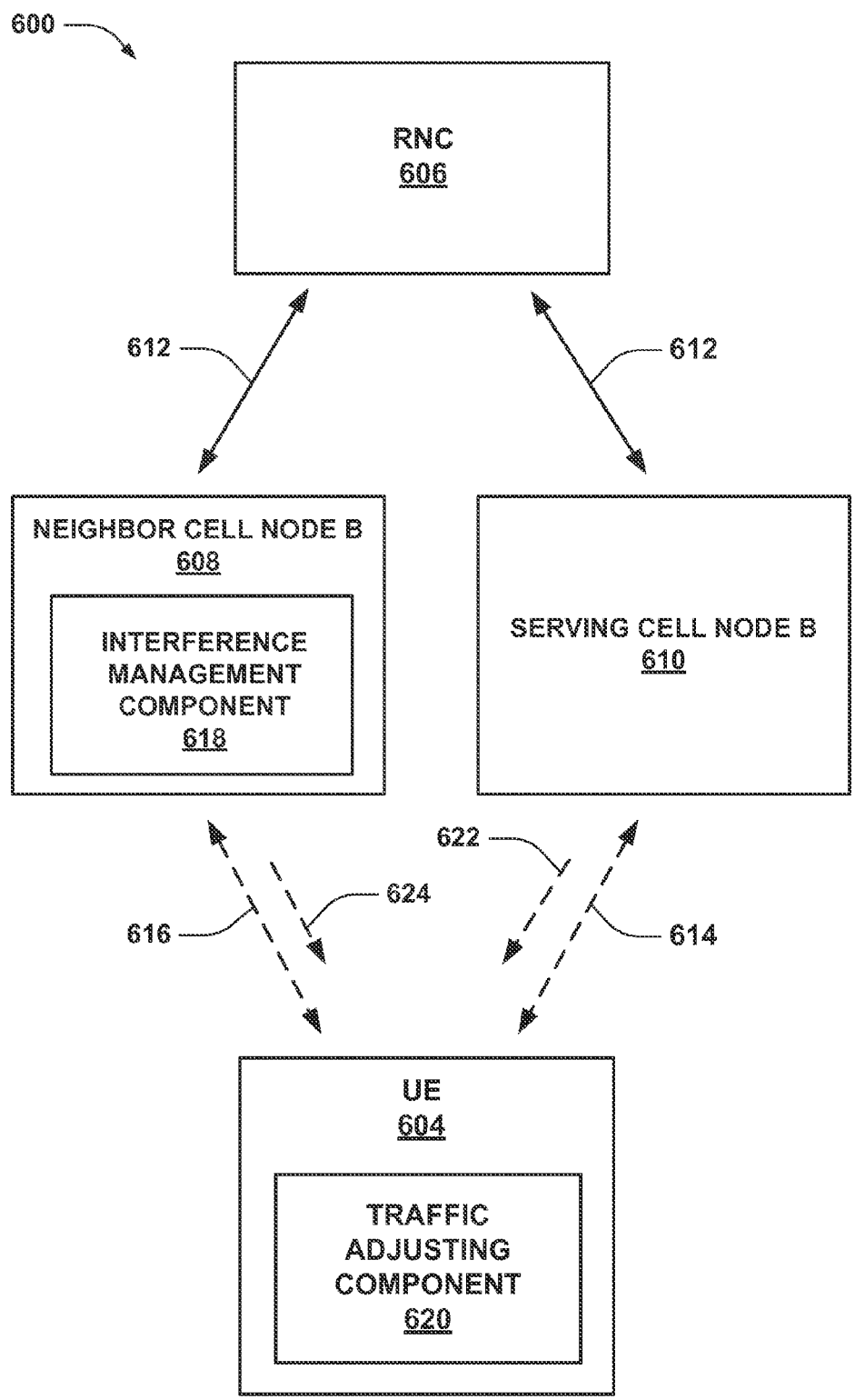
FIG. 6 is a system diagram of a wireless communication system in aspects of the present disclosure.

FIG. 6 depicts an example wireless communications system 600, which may facilitate communication between a core network, such as the Internet, and a user equipment (UE) 604. Radio network controller (RNC) 606 may control one or more Node Bs (e.g. neighbor cell Node B 608 and serving Node B 610) through signals transmitted via one or more communication channels 612, which may serve as the IuB interface in UMTS.

In an aspect of the present invention, serving cell Node B 610 may directly serve UE 604 by communicating data and control signals directly to UE 604 over a communication link 614. Communication link 614 may include an uplink (UL) channel, which may carry communications to serving cell Node B 610 originating at UE 604, and a downlink (DL) channel, which may carry communications to UE 604 from serving cell Node B 610. Serving cell Node B 610 may provide data and/or control signaling to UE 604 on the DL and receive UL data or feedback from UE 604 where the UE 604 is currently camped on and/or located in a serving cell governed by serving cell Node B 610. The current serving cell may include one or more neighbor cells, one of which may be neighbor cell Node B 608. Furthermore, neighbor cell Node B 608 may be in the active set of UE 604, but may not currently be the serving cell Node B to UE 604. Nonetheless, neighbor cell Node B 608 may provide control information to UE 604 via communication link 616.

Furthermore, for UEs operating in CELL_DCH, due to the capability of these UEs to be configured for soft handover, a dedicated physical channel E-RGCH exists on the DL from both the serving cell Node B 610 and the neighbor cell Node Bs (e.g. neighbor cell Node B 608) in the active set of the UE 604. Transmitted on the DL on the enhanced dedicated channel relative grant channel (E-RGCH) from all cells in a serving enhanced dedicated channel (E-DCH) radio link set is a signal called the serving relative grant 622. This serving relative grant signal 622 allows the scheduler of the serving cell Node B 610 to incrementally adjust the serving grant of the UEs under its control, which correspondingly adjusts the rate of data transmission on the UL from the UE 604. Additionally, because there is one serving cell Node B 610 serving a particular UE 604 at a given time, there will be one serving relative grant signal received by the UE 604 at a given time. The serving relative grant signal 622 may take three different values: UP, DOWN, or HOLD. The UP value instructs the UE 604 to increase the serving grant from the last known transmission rate, the down value instructs the UE 604 to decrease the serving grant from the last known transmission rate, and the HOLD value instructs the UE 604 to continue its last known transmission rate.

In addition, transmitted on the downlink of the E-RGCH channel from neighbor cell Node B 608 may be a non-serving relative grant signal 624. This non-serving relative grant signal 624 allows neighbor cell Node Bs, such as neighbor cell node B 608, to adjust the UL transmission rate of the UEs 604 not under the control of the neighbor cell Node Bs to avoid overload situations at the neighbor cell Node B 608. Because there may be multiple neighbor cells to the serving cell of a UE 604, by definition, there may be multiple non-serving relative grant signals 624 received by the UE 604 at a given time. In addition, the E-RGCH may be a shared channel, in that the channel is monitored by all UEs that have the particular neighbor cell in their active sets. Furthermore, the non-serving relative grant signal 624 may include two different values, DOWN and HOLD. Like the serving relative grant signal 622, a DOWN value for the non-serving relative grant signal 624 instructs the UE 604 to decrease the serving grant from the last known transmission rate, while the HOLD value instructs the UE 604 to continue its last known transmission rate.

Conversely, UEs operating in a CELL_FACH state are traditionally incapable of listening to an E-RGCH, and therefore may not receive non-serving relative grant messages. In an aspect of the apparatus and methods described herein, however, where a UE 604 in CELL_FACH mode enters an area in which it would be in soft handover if in CELL_DCH mode, the UE 604 may begin listening to a shared E-RGCH channel for non-serving relative grant signals from one or more neighbor cell Node Bs 608. Furthermore, neighbor cell Node B 608 may contain an interference management component 618 that may measure interference from UL transmissions originating from UEs (e.g. UE 604) in other cells. If this intercell interference reaches a threshold value, which may, for example, be preconfigured or communicated by RNC 606 or another network component, interference management component 618 may transmit a non-serving relative grant signal 624, which may have a DOWN value, to the UEs in neighbor cells over the shared E-RGCH channel. As a result, all UEs listening to the shared E-RGCH channel may receive and process the non-serving relative grant signal 624 and may adjust their individual transmission rate and/or power accordingly. In an aspect, UE 604 and/or other UEs in wireless communications system 600 may include a traffic adjusting component 620, which may adjust the transmission rate and/ or power of the UE on the uplink, e.g. in response to receiving a non-serving relative grant signal 624 and/or a serving relative grant signal 622. As such, inter-node interference and neighbor cell Node B overload may be lessened or avoided when one or more UEs are unable to perform soft handoff, such as UEs operating in a non-CELL_DCH mode, such as CELL_FACH mode.

For example, neighbor cell Node B 608, interference management component 618, and/or serving cell Node B 610 configured to perform the interference management functionality described herein, which may be carried out or include, for example, processing system 114, processor 104, and/or computer-readable medium 106. Furthermore, in an aspect, serving cell Node B 610 and/or neighbor cell Node B 608 may be Node B 510 of FIG. 5, Node Bs 346, 342, and/or 344 of FIG. 3, and/or Node B 208 of FIG. 2, and UE 604 may be UE 550 of FIG. 5, UEs 330, 332, 334, 336, 338, 340 of FIG. 3, and/or UE 210 in FIG. 2, any of which may be configured to perform the interference management functionality described herein.

Figure 7:
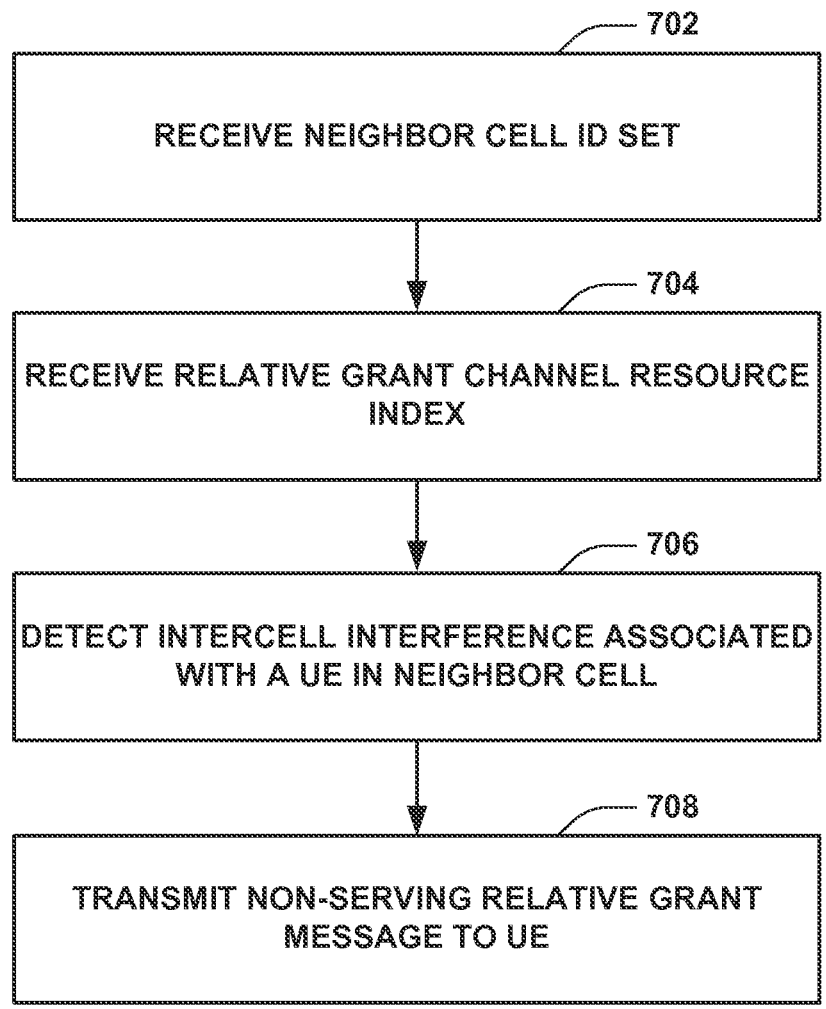
FIG. 7 is a flow diagram of an example method for managing intercell interference at a Node B in the present disclosure.

FIG. 7 depicts an example method 700 for managing intercell interference at a Node B, which may be a neighbor cell Node B (e.g. neighbor cell Node B 608, FIG. 6). At block 702, a Node B may receive a neighbor cell identification set that may indicate one or more neighbor cells (e.g. 302, 304, 306, FIG. 3) relative to the cell serviced by the Node B. In an aspect, the neighbor cell identification set may be received in a signal from a radio network controller (e.g. radio network controller 606, FIG. 6). In an additional aspect, the neighbor cell identification set may include the primary scrambling code (PSC) of one or more of the neighbor cells. Alternatively or additionally, a unique neighbor list may be signaled through a System Information Block (SIB) portion of a System Information Message from the radio network controller or any other network component. Specifically, the unique neighbor list may be part of SIB 11, which may contain measurement control information and the neighbor cell identification set and may allow for the Node B to be aware of its neighbor cells and how to communicate with the network.

Furthermore, in an aspect, a flag may be added to cell identifiers (cellIDs) in the neighbor cell identification set in the SIB 11 message to indicate which cells support communication via a common E-RGCH channel to allow communication with UEs in other cells. In a further aspect, the flag may be a one bit flag per cellID to minimize overhead. Alternatively or additionally, this information may also be conveyed as part of an existing dedicated signaling message. This existing dedicated signaling message may be received at radio bearer setup. In an aspect, a cellID list conveyed as part of this dedicated signaling message may be cross-referenced with the cellID from the SIB 11 message to allow the Node B or n UE in communication with the Node B to infer the PSCs and other information related to the cells in the cellID list or neighbor cell identification set.

In addition, at block 704, the Node B may receive a relative grant channel resource index corresponding to a non-serving relative grant channel shared by at least one of the neighbor cells of the Node B. In an aspect, the non-serving relative grant channel resource index may be received in a signal from a radio network controller (e.g. radio network controller 606, FIG. 6). The relative grant channel resource index may inform the Node B of the connection, setup, or other parameters associated with a relative grant channel. Furthermore, where the Node B is a serving cell Node B (e.g., serving cell Node B 610, FIG. 6) the relative grant channel resource index may correspond to a serving relative grant channel, which may transmit one or more serving relative grant messages to UEs in the cell of the serving cell Node B. Alternatively, where the Node B is a neighbor cell Node B from the vantage point of a UE in the serving cell (e.g. UE 604, FIG. 6), the relative grant channel resource index may correspond to a non-serving relative grant channel, which may transmit one or more non-serving relative grant messages to the UE over a relative grant channel shared with other neighbor cell Node Bs. In an aspect, this shared channel may be an enhanced dedicated channel relative grant channel (E-RGCH). Additionally, based upon the relative grant channel resource index, the Node B may establish a communication via the relative grant channel.

In a further aspect, the shared relative grant channel may have a spreading code that may be, for non-limiting example, hardcoded or broadcast in an SIB, and the spreading factor may be 128, though other spreading factors are also possible. Furthermore, the shared relative grant channel may commence communication approximately 5120 chips after a Primary Common Control Physical Channel is broadcast, received, and/or processed by the UE and/or the Node B, though other chip lengths are also available. In an additional non-limiting aspect, the transmission time interval (TTI) for the shared relative grant channel may be approximately 10 ms, though other TTI periods may also be utilized.

Additionally, at block 706, the Node B may detect intercell interference associated with a user equipment in one or more neighbor cells. In an aspect, the Node B may measure an interference level, which may be the result of a UE in a neighbor cell transmitting data on an uplink with another Node B, and compare that interference level to an intercell interference threshold value. This intercell interference threshold value may be preconfigured or defined by a network controller (e.g. RNC 606, FIG. 6).

In an aspect, at block 708, if the intercell interference level exceeds the intercell interference threshold value, the Node B may transmit one or more non-serving relative grant signals to one or more UEs in neighbor cells over the shared non-serving relative grant channel, which may be a shared E-RGCH. Additionally, where the intercell interference threshold value has been exceeded, these non-serving relative grant signals may have a DOWN value. As a result, the neighbor cell UEs may receive the one or more DOWN non-serving relative grant signals, e.g. non-serving relative grant signals 624 (FIG. 6), and decrease their individual uplink data rates or transmit power based on the one or more non-serving relative grant signals 624. As such, a neighbor cell Node B may control the interference level experienced at the neighbor cell by sending non-serving relative grant messages over a shared non-serving relative grant channel, such as for when a UE in CELL_FACH mode and not being served by the neighbor cell Node B enters an area in which it would be in soft handover with the neighbor cell Node B if in CELL_DCH mode.

Figure 8:
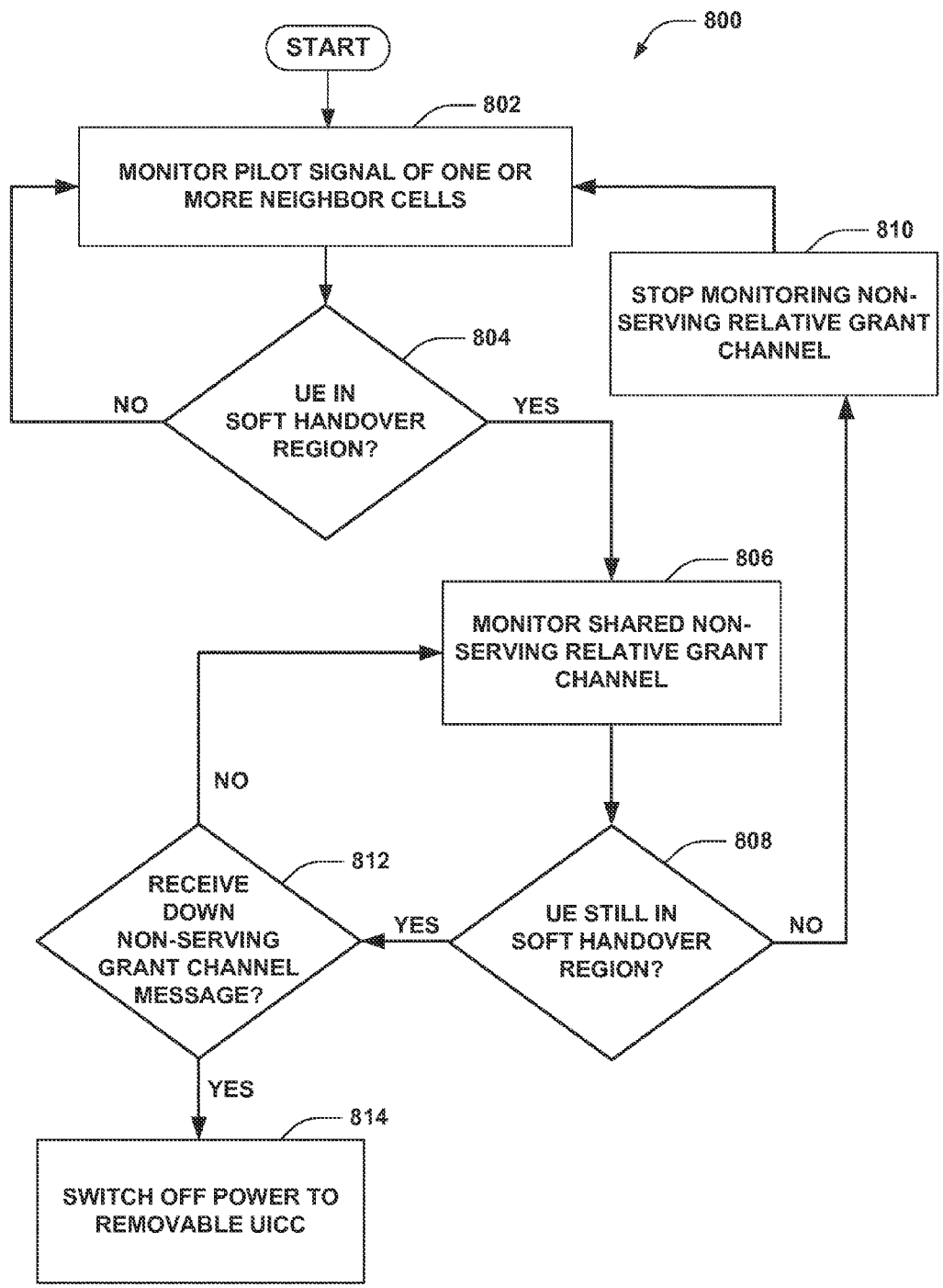
FIG. 8 is a flow diagram of an example method for adjusting uplink traffic characteristics at a UE in the present disclosure.

FIG. 8 depicts an example method 800 for managing intercell interference at a UE (e.g., UE 604 FIG. 6). In an aspect of the present disclosure, where a UE is in a soft handover region, it may be likely that the UE is in close proximity to a neighbor cell or a neighbor cell Node B, and therefore the likelihood of causing intercell interference on the UE uplink may be elevated. By monitoring the non-serving relative grant channel when in these soft handover regions, the UE may react to non-serving relative grant signals 624 (FIG. 6) accordingly to adjust its UL characteristics.

In an aspect, a UE may reside in a serving cell and communicate directly with a serving cell Node B (e.g., serving cell Node B 610, FIG. 6). Additionally, the UE may monitor characteristics of nearby cells, which may also be called neighbor cells or neighbor cells. For example, the UE may monitor pilot signals transmitted by one or more neighbor cell Node Bs (e.g., neighbor cell Node B 608, FIG. 6) and determine a signal strength associated with this or other neighbor cell Node B transmissions. In an aspect of the present disclosure, a UE may move through a wireless coverage area associated with a wireless communications system and may enter an area in which the UE or network may determine that handoff, for example, soft handoff, to a neighbor cell, is possible. This determination may be based on the UE measuring the signal strength associated with a neighbor cell.

Furthermore, as outlined above, the UE may operate in several states, two of which are a CELL_DCH state, wherein the UE is able to be handed over to a new cell, and a CELL_FACH state, wherein the UE is unable to be handed over. When operating in a state incompatible with soft handover procedures, which may include, but is not limited to the CELL_FACH state in UMTS, the UE may nonetheless monitor pilot signal conditions, such as signal strength, or one or more neighbor cells at block 802. Additionally, for the purpose of determining which neighbor cells to monitor, the UE may, for example, reuse Event 1a criteria for UEs operating in CELL_DCH. In an aspect, Event 1a may occur when the power level of a neighbor cell has reached a threshold level, which may be configured by the network.

From these measurements, the UE may determine, at block 804, whether the UE is in a soft handover region, which, in a non-limiting example, may be defined as an area wherein soft handover would be available if the UE was operating in a state capable of experiencing soft handover. In an additional aspect, the UE may measure a path loss difference between its serving cell and the monitored non-serving cell. Where this difference is less than a soft handover threshold, which may be configured by the network or the RNC, the UE may determine that it is in a soft handover region.

Furthermore, monitoring of a pilot signal of a neighbor cell channel may be temporary and discontinuous when the UE is operating in CELL_FACH mode. For example, in an aspect, the monitoring may occur only once per CELL_FACH session, as oftentimes CELL_FACH sessions are characterized by short, bursty transmission intervals. In an aspect, a CELL_FACH session may be defined as the period from when the UE is allocated a shared dedicated channel resource, for example, a resource associated with a shared non-serving relative grant channel, to the time the UE releases this resource. As a consequence of this relatively short pilot monitoring period associated with UEs operating in a CELL_FACH state, a UE may not correctly detect whether a pilot signal transmitted by a neighbor cell is truly strong or weak. For example, due to the short monitoring duration period, a UE may monitor a weak pilot signal that in fact corresponds to a typically strong pilot signal that was in deep fade at the moment of monitoring by the UE and, thus, the pilot signal strength would not reach a soft handover threshold and would not begin monitoring the shared non-serving relative grant channel. As such, the neighbor cell would lack the ability to send a DOWN value non-serving relative grant to the UE in the event that the UE UL was causing interference at the neighbor cell that had been in deep fade at the moment of monitoring. As an alternative consequence of a short pilot monitoring period, the UE may measure an unusually strong pilot from a neighbor cell that should not be characterized as a soft handover region-triggering neighbor cell due to a short pilot power burst. In this case, the UE may declare this weak neighbor cell as a candidate for declaring the UE in a soft handover region, where such a declaration is truly unwarranted. The UE in this situation, for example, may waste power resources by listening to the shared non-serving relative grant channel associated with this neighbor cell when the likelihood of interference is very minimal.

To more correctly monitor the pilot signals of neighbor cells to avoid such situations, the UE may be configured with a minimum neighbor cell monitoring period at block 804 to allow for a more accurate pilot signal reading. In an aspect, this minimum neighbor cell monitoring period may be defined as starting at the beginning of a random access channel (RACH) procedure persistence check and may conclude at the establishment of an E-DCH Dedicated Physical Data Channel (E-DPDCH). In other words, in a non-limiting aspect, the earliest the UE may decide whether to listen to a shared non-serving relative grant channel or declare itself to be in a soft handover region is at the start of its uplink E-DPDCH. In an alternative or additional aspect, the UE or the network may contain a timer that may control and track a minimum listening or monitoring duration for a UE to monitor a given neighbor cell pilot signal.

In a further aspect, where the UE determines at block 804 that the UE is not in a soft handover region, the UE may continue monitoring one or more conditions related to one or more neighbor cells. Conversely, where the UE determines at block 804 that the UE is in a soft handover region, the UE may begin monitoring a relative grant channel at block 806. In an aspect of the present disclosure, the relative grant channel may be a shared non-serving relative grant channel, such as, but not limited to an E-RGCH.

Additionally, once the UE begins monitoring the shared non-serving relative grant channel, it may continue to monitor the one or more neighbor cells to determine if the UE is still in a soft handover region at block 808. Where the UE is no longer in a soft handover region, the UE may stop monitoring the shared non-serving relative grant channel at block 810 and revert to simply monitoring the one or more neighbor cells as in block 802 if one or more is detectable at a given time. However, if the UE remains in a soft handover region at block 808, the UE may continue to monitor the shared non-serving relative grant channel.

Furthermore, at block 812, the UE may determine whether it has received a non-serving relative grant message on the channel with a value indicating that the UE should adjust its transmission characteristics. For example, such a value may be a DOWN value of a non-serving relative grant. In an aspect, where the UE has not received such a message, or has received a HOLD value on a received non-serving relative grant, the UE may simply continue to monitor the shared non-serving relative grant channel, for example, at block 806. Alternatively, where the UE has received a non-serving relative grant message on the channel with a value indicating that the UE should adjust its transmission characteristics at block 812, the UE may adjust one or more transmission characteristics, for example, on an uplink channel at block 814. In an aspect, these one or more characteristics may include, but are not limited to, transmission rate or transmission power. As a result, by monitoring the non-serving relative grant channel when in these soft handover regions, the UE may react to non-serving relative grant messages, such as non-serving relative grant signals 624 (FIG. 6), and from time to time may adjust its UL characteristics at the command of non-serving cell Node Bs or other network resources or devices.

Figure 9:
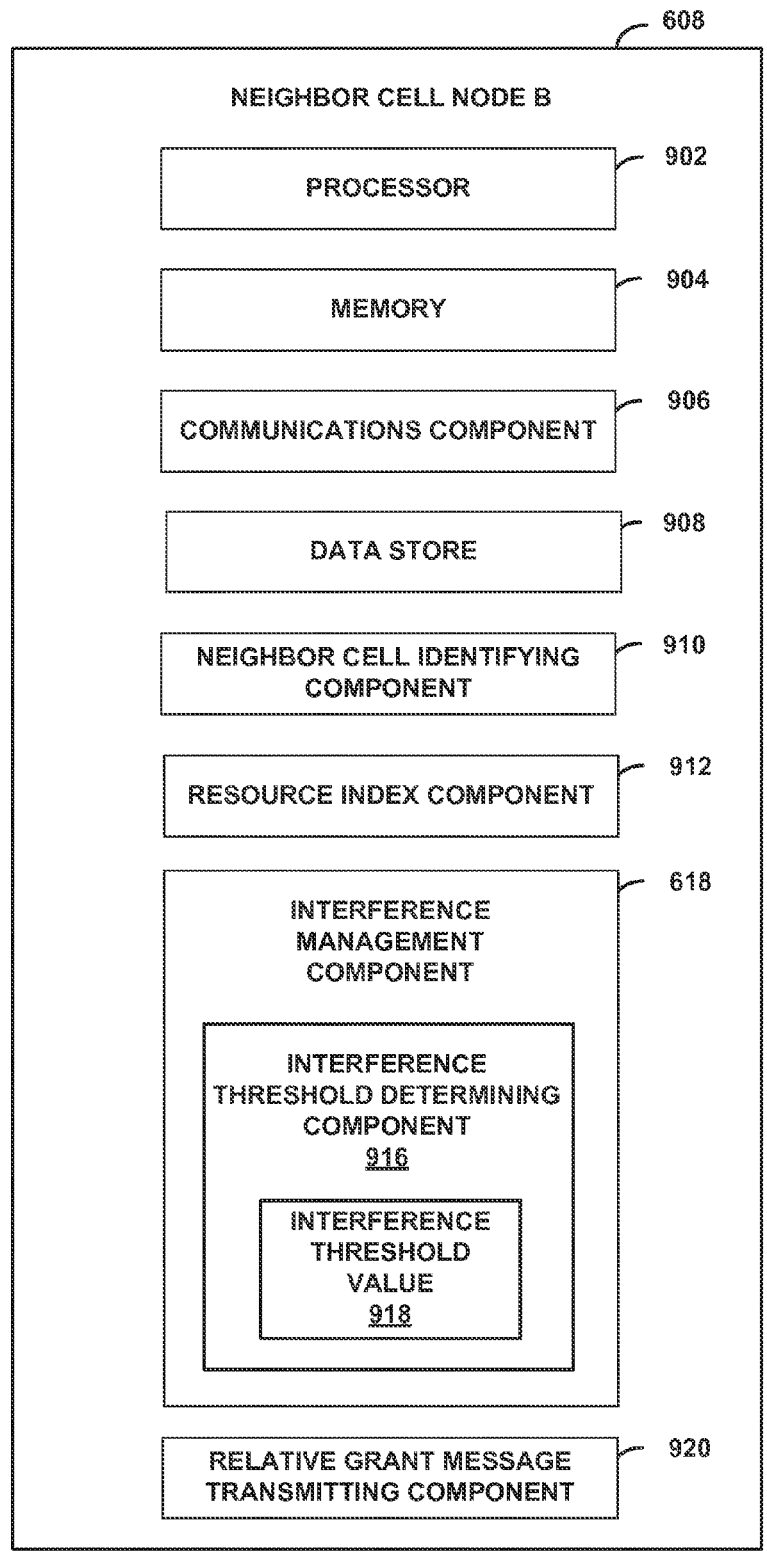
FIG. 9 is a block diagram of aspects of an example neighbor Node B in the present disclosure.

Referring to FIG. 9, a neighbor cell Node B 608 (FIG. 6) may include several components configured to manage inter-cell interference as described herein. In addition, serving cell Node B may itself contain the components represented in FIG. 9, as a serving cell to one UE may be a neighbor cell relative to an additional UE (not shown) spatially separated from UE 604 (FIG. 6). As depicted in FIG. 9, neighbor cell Node B 608 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Neighbor cell Node B 608 further includes a memory 904, such as for storing data used herein and/or local versions of applications being executed by processor 902. Memory 904 can include any type of memory usable by a computer, such as random access memory (RAM), read only memory (ROM), tapes, magnetic discs, optical discs, volatile memory, non-volatile memory, and any combination thereof.

Further, neighbor cell Node B 608 includes a communications component 906 that provides for establishing and maintaining communications with one or more parties utilizing hardware, software, and services as described herein. Communications component 906 may carry communications between components on neighbor cell Node B 608, as well as between neighbor cell Node B 608 and external devices, such as devices located across a communications network and/or devices serially or locally connected to neighbor cell Node B 608. For example, communications component 906 may include one or more buses, and may further include transmit chain components and receive chain components associated with a transmitter and receiver, respectively, operable for interfacing with external devices.

Additionally, neighbor cell Node B 608 may further include a data store 908, which can be any suitable combination of hardware and/or software, that provides for mass storage of information, databases, and programs employed in connection with aspects described herein. For example, data store 908 may be a data repository for applications not currently being executed by processor 902.

Furthermore, neighbor cell Node B 608 may include a neighbor cell identifying component 910, which may configured to receive a neighbor cell identification set, which may indicate one or more neighbor cells to a Node B, which may be the cell serviced by neighbor cell Node B 604 or any other Node B in a wireless communication system. In an aspect, neighbor cell identifying component 910 may be located in communications component 906 or be communicatively connected thereto. Additionally, neighbor cell identifying component 910 may be configured to receive a compatibility indicator associated with each of the one or more neighbor cells that may indicate whether each of the one or more neighbor cells is configured to communicate via a shared non-serving relative grant channel.

Furthermore, neighbor cell Node B 608 may include a resource index component 912, which may be configured to receive a relative grant channel resource index corresponding to a non-serving relative grant channel. In an aspect, resource index component 912 may be located in communications component 906 or be communicatively connected thereto. Additionally, resource index component 912 may set up establish a connection or channel to a shared non-serving relative grant channel for the neighbor cell Node B 608 according to the received relative grant channel resource index so as to allow the neighbor cell Node B 608 to transmit signals to UEs that may adjust the transmission characteristics of the UEs.

Additionally, neighbor cell Node B 608 may include an interference management component 618, which may be configured to manage intercell interference at the neighbor cell Node B as to avoid cell overload conditions or compromised signal transmission or receipt. Furthermore, interference management component 618 may contain an intercell interference detecting component 914, which may be configured to detect intercell interference associated with a UE in one or more neighbor cells. Intercell interference detecting component 914 may, for example, include an antenna, antennas, a receiver, transceiver, or any component configured to detect signal transmission.

In a further aspect, interference management component 618 may include an interference threshold determining component 916, which may configured to compare a measured or detected intercell interference from the interference detecting component 914 with a stored intercell interference threshold value 918. Where the measured intercell interference level reaches the intercell interference threshold value 918, the interference management component 618 may signal another component, such as communications component 906 or a relative grant message transmitting component 920, to transmit a non-serving relative grant message to one or more UEs on a shared non-serving relative grant channel. In an aspect, relative grant message transmitting component 920 may also be included in communications component 906 and may include a transmitter, transceiver, or any other component capable of transmitting a wireless signal over a dedicated channel.

Figure 10:
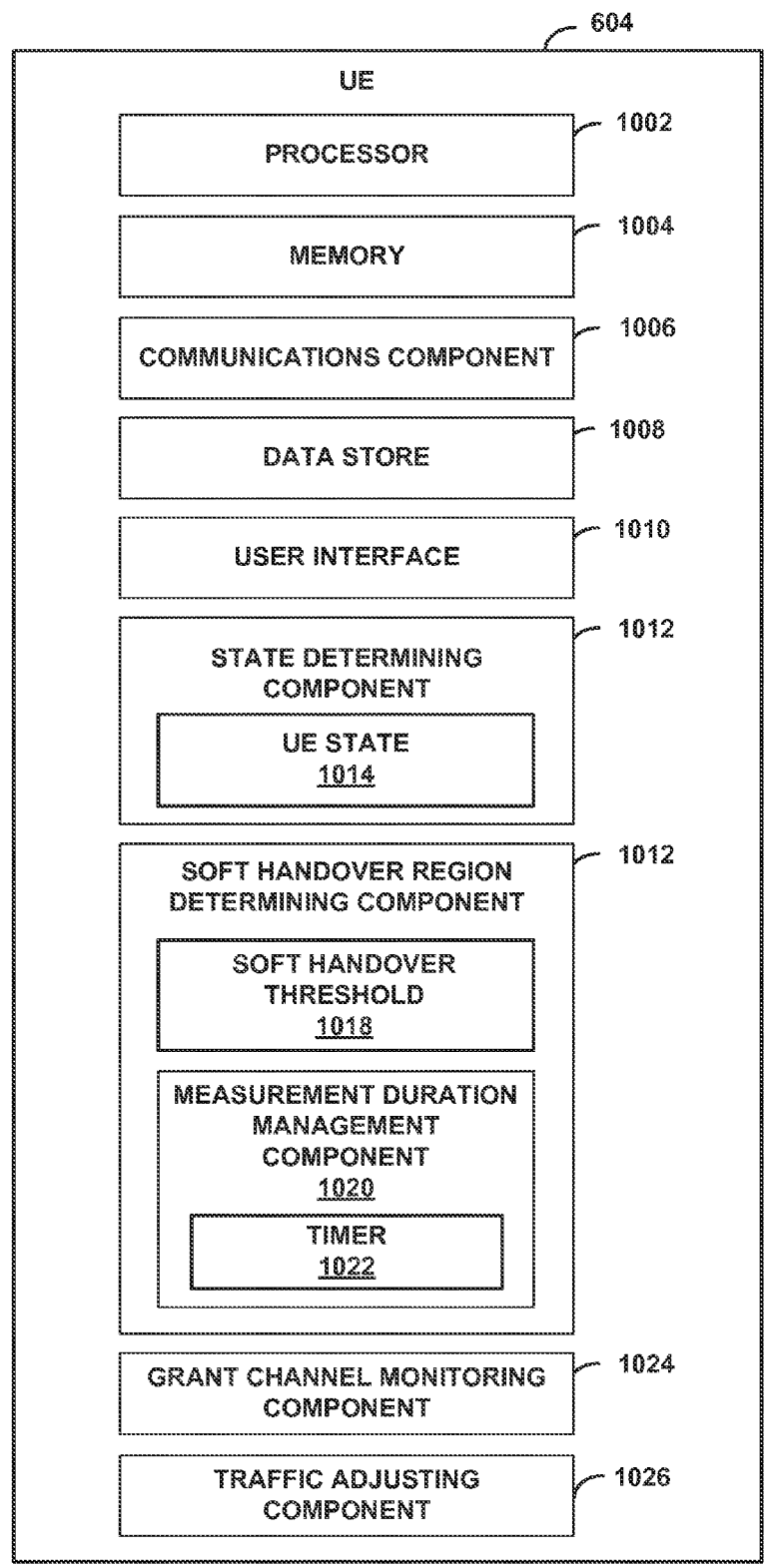
FIG. 10 is a block diagram of aspects of an example UE in the present disclosure.

Turning to FIG. 10, a UE (e.g., UE 604, FIG. 6) may include several components configured to adjust uplink transmission characteristics of the UE described herein. As depicted in FIG. 10, UE 604 includes a processor 1002 for carrying out processing functions associated with one or more of components and functions described herein. Processor 1002 can include a single or multiple set of processors or multi-core processors. Moreover, processor 1002 can be implemented as an integrated processing system and/or a distributed processing system.

UE 604 further includes a memory 1004, such as for storing data used herein and/or local versions of applications being executed by processor 1002. Memory 1004 can include any type of memory usable by a computer, such as random access memory (RAM), read only memory (ROM), tapes, magnetic discs, optical discs, volatile memory, non-volatile memory, and any combination thereof.

Further, UE 604 includes a communications component 1006 that provides for establishing and maintaining communications with one or more parties utilizing hardware, software, and services as described herein. Communications component 1006 may carry communications between components on UE 604, as well as between UE 604 and external devices, such as devices located across a communications network and/or devices serially or locally connected to UE 604. For example, communications component 1006 may include one or more buses, and may further include transmit chain components and receive chain components associated with a transmitter and receiver, respectively, operable for interfacing with external devices.

Additionally, UE 604 may further include a data store 1008, which can be any suitable combination of hardware and/or software, that provides for mass storage of information, databases, and programs employed in connection with aspects described herein. For example, data store 1008 may be a data repository for applications not currently being executed by processor 1002.

UE 604 may additionally include a user interface component 1010 operable to receive inputs from a user of UE 604, and further operable to generate outputs for presentation to the user. User interface component 1010 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1010 may include one or more output devices, including but not limited to a display, a speaker, a haptic feedback mechanism, a printer, any other mechanism capable of presenting an output to a user, or any combination thereof.

Furthermore, UE 604 may include a state determining component 1012, which may be configured to receive and store a UE state 1014 associated with the UE 604. In an aspect, state determining component 1012 may receive a UE state indication message from the network, such as a serving or non-serving cell Node B, which the state determining component may store as its current UE state 1014. In an aspect, UE state 1014 may be one of CELL_DCH, CELL_FACH, URA_PCH, CELL_PCH, or any other UE state defined for wireless communication in UMTS or any other wireless technology.

In a further aspect, UE 604 may include a soft handover region determining component 1016, which may be configured to determine whether UE 604 is currently in a region in which soft handover would be feasible were the UE 604 to be operating in a state that supported soft handover. Soft handover region determining component 1016 may monitor one or more pilot signals transmitted by one or more Node Bs associated with one or more neighbor cells, and may determine the signal strength associated with these one or more pilot signals. Furthermore, soft handover region determining component 1016 may compare these one or more pilot signal strengths with a stored soft handover threshold 1018, and may determine that UE 604 is in a soft handover region where a measured pilot signal strength meets or surpasses the value of the stored soft handover threshold 1018. In an aspect, stored soft handover threshold 1018 may be preconfigured by a manufacturer or designer or may be configured by a network in a soft handover threshold-setting transmission.

Furthermore, soft handover region determining component 1016 may include a measurement duration management component 1020, which may be configured to control the duration or period length of measurement of the one or more neighbor cell pilot signals. In an aspect, measurement duration management component 1020 may include a timer 1022, which may track the measurement duration and control for how long UE 604 measures pilot signals to obtain an accurate representation of pilot signal strength and/or neighbor cell proximity.

In an additional aspect, UE 604 may include a relative grant channel monitoring component 1024, which may be configured to monitor one or more dedicated relative grant channels. These one or more dedicated relative grant channels may include a shared non-serving relative grant channel, E-RGCH, a serving relative grant channel, or any other dedicated grant channel. Furthermore, relative grant channel monitoring component 1024 may receive indication signals from components external or internal to UE 604, for example, soft handover region determining component 1012, which may indicate to relative grant channel monitoring component 1024 to begin monitoring one or more dedicated relative grant channels. In an additional aspect, grant channel monitoring component 1024 may receive non-serving relative grant messages or signals that may command the UE to adjust its uplink transmission characteristics.

Additionally, UE 604 may include a traffic adjusting component 1026, which may be configured to adjust UE uplink transmission characteristics, for example, in response to a non-serving relative grant signal received at relative grant channel monitoring component 1024. In an aspect, traffic adjusting component 1026 may adjust a data rate, such as a transmission rate, or an associated transmission power on the UE uplink, though other transmission characteristics may also be adjusted.

Figure 11:
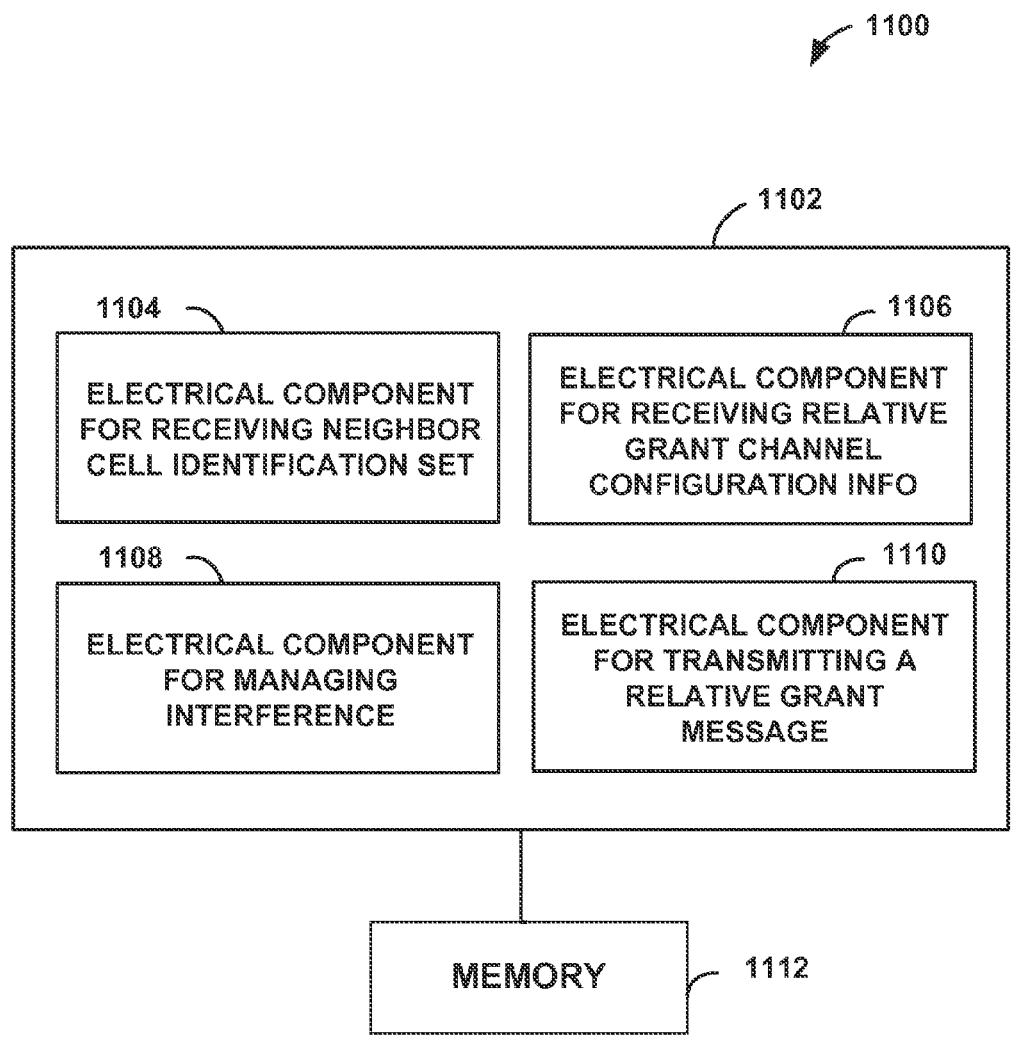
FIG. 11 is a block diagram of aspects of an example logical grouping of electrical components in a Node B of the present disclosure.

Turning to FIG. 11, an example system 1100 is displayed for selectively resetting and/or transferring one or more communication channels. For example, system 1100 can reside at least partially within a device. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component 1104 for receiving a neighbor cell identification set, which may indicate one or more neighbor cells. In an aspect, electrical component 1104 may receive the neighbor cell identification set from a radio network controller or another network component. In a further aspect, electrical component 1104 may be neighbor cell identifying component 910 (FIG. 9).

Moreover, logical grouping 1102 can include an electrical component 1106 for receiving a relative grant channel resource index or other relative grant channel configuration information. In an aspect, this relative grant channel resource index or other relative grant channel configuration information may be transmitted from a radio network controller. Furthermore, electrical component 1106 may be configured to set up a connection with a relative grant channel, such as a shared non-serving relative grant channel, based on the received relative grant channel resource index. Additionally, electrical component 1106 may be resource index component 912 (FIG. 9).

In addition, logical grouping 1102 may contain an electrical component 1108 for managing interference, which may be intercell interference originating from a UE located in a neighbor cell. In some aspects, electrical component 1108 may further be configured to detect intercell interference and/or compare a detected interference level with an intercell interference threshold value. Additionally, electrical component 1108 may correspond to interference management component 608 (FIGS. 6, 9), intercell interference detecting component 914 (FIG. 9), and/or interference threshold determining component 916 (FIG. 9).

Furthermore, logical grouping 1102 may include an electrical component 1110 for transmitting a relative grant message, such as a non-serving relative grant message, to one or more UEs. In an aspect, electrical component 1110 may communicate with and receive control signals from electrical component 1108 where electrical component 1108 determines that an intercell interference threshold value has been met or exceeded. Moreover, electrical component 1110 may be relative grant message transmitting component 920 (FIG. 9).

Additionally, system 1100 can include a memory 1112 that retains instructions for executing functions associated with the electrical components 1104, 1106, 1108, and 1110, stores data used or obtained by the electrical components 1104, 1106, 1108, and 1110, etc. While shown as being external to memory 1112, it is to be understood that one or more of the electrical components 1104, 1106, 1108, and 1110 can exist within memory 1112. In one example, electrical components 1104, 1106, 1108, and 1110 can comprise at least one processor, or each electrical component 1104, 1106, 1108, and 1110 can be a corresponding module of at least one processor. Moreover, in an additional or alternative example, electrical components 1104, 1106, 1108, and 1110 can be a computer program product including a computer readable medium, where each electrical component 1104, 1106, 1108, and 1110 can be corresponding code.

Figure 12:
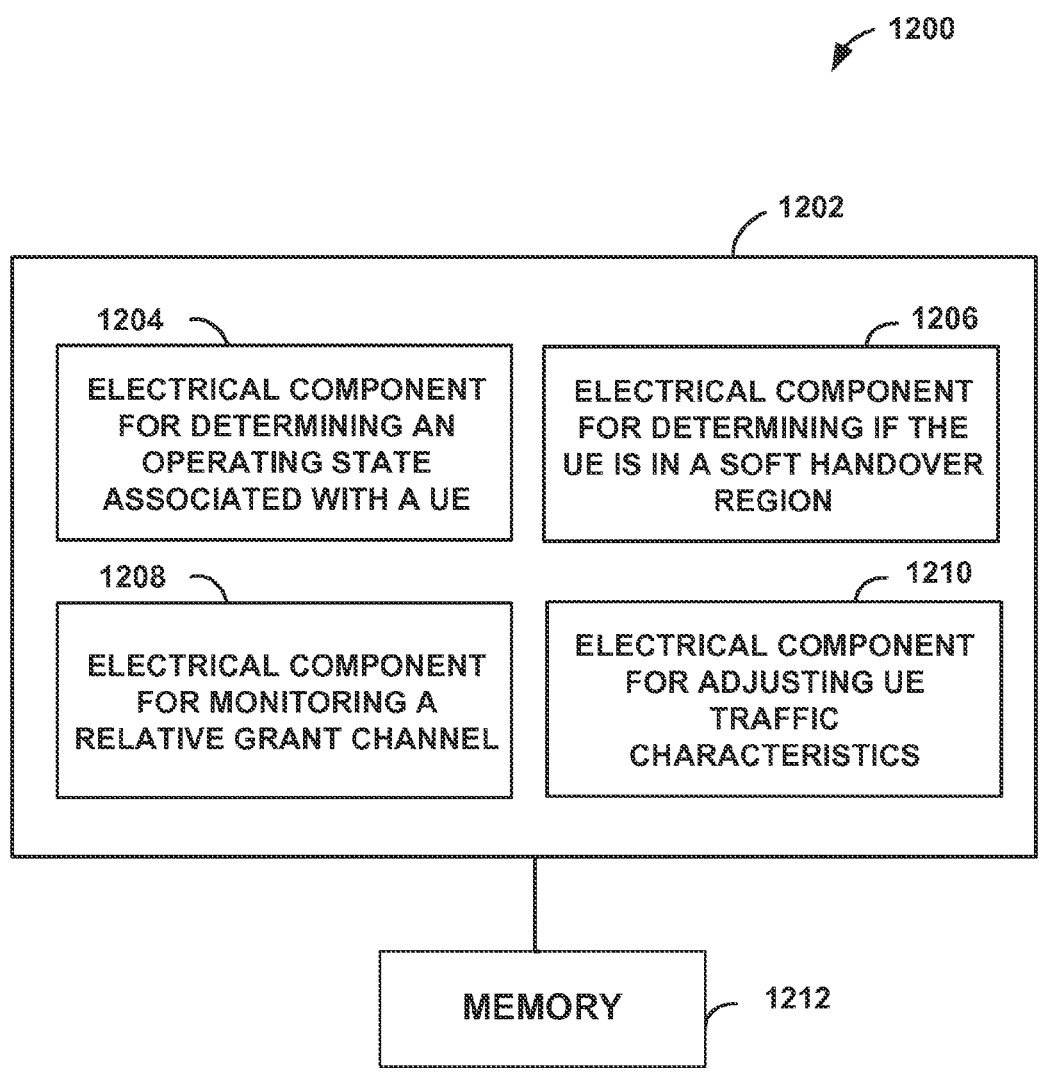
FIG. 12 is a block diagram of aspects of an example logical grouping of electrical components in a UE of the present disclosure.

Referring to FIG. 12, an example system 1200 is displayed for selectively resetting and/or transferring one or more communication channels. For example, system 1200 can reside at least partially within a device. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component 1204 determining an operating state associated with the UE and storing the operating state. In an aspect, electrical component 1204 may be state determining component 1012 (FIG. 10).

Moreover, logical grouping 1202 can include an electrical component 1206 for determining if the UE is in a soft handover region. In an aspect, electrical component 1206 may be further configured to set or manage a measurement duration wherein the UE may measure pilot signal(s) of neighbor cells. This measurement duration may be tracked or governed by a timer. Furthermore, electrical component 1206 may be configured to store a soft handover threshold value and may compare a measured pilot signal strength to the threshold to determine if the UE is in a soft handover region. Additionally, electrical component 1206 may be soft handover region determining component 1016 (FIG. 10), measurement duration managing component 1020 (FIG. 10), and may contain timer 1022 (FIG. 10) and soft handover threshold 1018 (FIG. 10).

In addition, logical grouping 1202 may include an electrical component 1208 for monitoring a relative grant channel, which may be configured to monitor a relative grant channel, such as, but not limited to a shared non-serving relative grant channel. In an aspect, electrical component 1208 may receive non-serving relative grant messages from one or more neighbor cells that may indicate that the UE is to alter its transmission characteristics. Furthermore, electrical component 1208 may be relative grant channel monitoring component 1024.

Furthermore, logical grouping 1202 may contain an electrical component 1210 for adjusting traffic characteristics of the UE 604 uplink. In an aspect, electrical component 1210 may receive an indication from electrical component 1208 that a neighbor cell or an associated neighbor cell Node B has indicated that the UE 604 is to adjust its uplink transmission characteristics to avoid intercell interference at the neighbor cell. In addition, electrical component 1210 may be traffic adjusting component 1026 (FIG. 10).

Additionally, system 1200 can include a memory 1212 that retains instructions for executing functions associated with the electrical components 1204, 1206, 1208, and 1210, stores data used or obtained by the electrical components 1204, 1206, 1208, and 1210, etc. While shown as being external to memory 1212, it is to be understood that one or more of the electrical components 1204, 1206, 1208, and 1210 can exist within memory 1212. In one example, electrical components 1204, 1206, 1208, and 1210 can comprise at least one processor, or each electrical component 1204, 1206, 1208, and 1210 can be a corresponding module of at least one processor. Moreover, in an additional or alternative example, electrical components 1204, 1206, 1208, and 1210 can be a computer program product including a computer readable medium, where each electrical component 1204, 1206, 1208, and 1210 can be corresponding code.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of managing intercell interference, comprising:
    receiving, at a neighbor cell relative to a serving cell of a user equipment (UE), a neighbor cell identification set indicating one or more neighbor cells, wherein the neighbor cell identification set includes the neighbor cell;
    detecting, at the neighbor cell, intercell interference associated with UE uplink transmissions to the serving cell; and
    transmitting, in response to detecting the intercell interference, a non-serving relative grant message to the UE on a relative grant channel shared by a plurality of the one or more neighbor cells, wherein the UE is in a CELL_FACH state.

2. The method of claim 1, further comprising determining that the intercell interference has reached an intercell interference threshold value, wherein the transmitting the non-serving relative grant message is based on the determining that the intercell interference threshold value is reached.

3. The method of claim 1, further comprising receiving a relative grant channel resource index indicating properties of the relative grant channel.

4. The method of claim 1, further comprising receiving a compatibility indicator associated with each of the one or more neighbor cells indicating whether each of the one or more neighbor cells is configured to communicate via the relative grant channel, wherein the transmitting is based on the compatibility indicator.

5. The method of claim 1, wherein transmitting the non-serving relative grant message to the UE comprises transmitting the non-serving relative grant message to the UE when the UE is in a soft handover region.

6. The method of claim 5, wherein the soft handover region comprises a region in which the UE would be in soft handover if it was operating in a CELL_DCH state.

7. An apparatus for managing intercell interference, comprising:
    means for receiving, at a neighbor cell relative to a serving cell of a user equipment (UE), a neighbor cell identification set indicating one or more neighbor cells, wherein the neighbor cell identification set includes the neighbor cell;
    means for detecting, at the neighbor cell, intercell interference associated with UE uplink transmissions to the serving cell; and
    means for transmitting, in response to detecting the intercell interference, a non-serving relative grant message to the UE on a relative grant channel shared by a plurality of the one or more neighbor cells, wherein the UE is in a CELL_FACH state.

8. The apparatus of claim 7, further comprising means for determining that the intercell interference has reached an intercell interference threshold value, wherein the means for transmitting the non-serving relative grant message transmits the non-serving relative grant message based on the determining that the intercell interference threshold value is reached.

9. The apparatus of claim 7, further comprising means for receiving a relative grant channel resource index indicating properties of the relative grant channel.

10. The apparatus of claim 7, wherein the means for transmitting the non-serving relative grant message to the UE comprises means for transmitting the non-serving relative grant message to the UE when the UE is in a soft handover region, and wherein the soft handover region comprises a region in which the UE would be in soft handover if it was operating in a CELL_DCH state.

11. A non-transitory computer-readable medium storing computer-executable code for:
    receiving, at a neighbor cell relative to a serving cell of a user equipment (UE), a neighbor cell identification set indicating one or more neighbor cells, wherein the neighbor cell identification set includes the neighbor cell;
    detecting, at the neighbor cell, intercell interference associated with UE uplink transmissions to the serving cell; and
    transmitting, in response to detecting the intercell interference, a non-serving relative grant message to the UE on a relative grant channel shared by a plurality of the one or more neighbor cells, wherein the UE is in a CELL_FACH state.

12. The non-transitory computer-readable medium of claim 11, wherein the computer-readable medium stores code for determining that the intercell interference has reached an intercell interference threshold value, wherein the code for transmitting the non-serving relative grant message comprises code for transmitting the non-serving relative grant message based on the determining that the intercell interference threshold value is reached.

13. The non-transitory computer-readable medium of claim 11, wherein the computer-readable medium stores computer-executable code for receiving a relative grant channel resource index indicating properties of the relative grant channel.

14. The non-transitory computer-readable medium of claim 11, wherein the computer-readable medium stores computer-executable code for transmitting the non-serving relative grant message to the UE when the UE is in a soft handover region, and wherein the soft handover region comprises a region in which the UE would be in soft handover if it was operating in a CELL_DCH state.

15. An apparatus for managing intercell interference, comprising:
    at least one processor; and
    a memory coupled to the at least one processor, wherein the at least one processor is configured to execute processor-executable instructions stored on the memory that cause the processor to:
        receive, at a neighbor cell relative to a serving cell of a user equipment (UE), a neighbor cell identification set indicating one or more neighbor cells, wherein the neighbor cell identification set includes the neighbor cell;

detect, at the neighbor cell, intercell interference associated with UE uplink transmissions to the serving cell; and transmit, in response to detecting the intercell interference, a non-serving relative grant message to the UE on a relative grant channel shared by a plurality of the one or more neighbor cells, wherein the UE is in a CELL_FACH state.

16. The apparatus of claim 15, wherein the at least one processor is configured to execute processor-executable instructions stored on the memory that cause the processor to determine that the intercell interference has reached an intercell interference threshold value, wherein transmitting the non-serving relative grant message is based on the determining that the intercell interference threshold value is reached.

17. The apparatus of claim 15, wherein the at least one processor is configured to execute processor-executable instructions stored on the memory that cause the processor to receive a relative grant channel resource index indicating properties of the relative grant channel.

18. The apparatus of claim 15, wherein the at least one processor is configured to execute processor-executable instructions stored on the memory that cause the processor to receive a compatibility indicator associated with each of the one or more neighbor cells indicating whether each of the one or more neighbor cells is configured to communicate via the relative grant channel, wherein the transmitting is based on the compatibility indicator.

19. The apparatus of claim 15, wherein the at least one processor is configured to execute processor-executable instructions stored on the memory that cause the processor to transmit the non-serving relative grant message to the UE when the UE is in a soft handover region.

20. The apparatus of claim 19, wherein the soft handover region comprises a region in which the UE would be in soft handover if it was operating in a CELL_DCH state.

21. A method for managing intercell interference, comprising:

determining, at a user equipment (UE) that is operating in a CELL_FACH state, that the UE is in a soft handover region, wherein the UE operating in the CELL_FACH state is characterized by the UE having no dedicated physical channels;

monitoring a relative grant channel based on determining that the UE is in the soft handover region;

receiving a non-serving relative grant message on the relative grant channel from a non-serving neighbor cell; and adjusting one or more uplink transmission characteristics based upon the non-serving relative grant message.

22. The method of claim 21, wherein determining that the UE is in the soft handover region comprises determining that the UE is in a region in which the UE would be in soft handover if it was operating in a CELL_DCH state.

23. The method of claim 21, wherein the determining that the UE is in a soft handover region occurs over a minimum cell monitoring period.

24. The method of claim 21, wherein determining that the UE is in a soft handover region further comprises:

measuring one or more pilot signals transmitted from one or more neighbor cell Node Bs;

comparing the one or more pilot signals to a soft handover threshold; and determining that the one or more pilot signals meets or exceeds the soft handover threshold.

25. An apparatus for managing intercell interference, comprising:

means for determining, at a user equipment (UE) that is operating in a CELL_FACH state, that the UE is in a soft handover region, wherein the UE operating in the CELL_FACH state is characterized by the UE having no dedicated physical channels;

means for monitoring a relative grant channel based on determining that the UE is in the soft handover region;

means for receiving a non-serving relative grant message on the relative grant channel from a non-serving neighbor cell; and means for adjusting one or more uplink transmission characteristics based upon the non-serving relative grant message.

26. The apparatus of claim 25, wherein the means for determining that the UE is in the soft handover region comprises means for determining that the UE is in a region in which the UE would be in soft handover if it was operating in a CELL_DCH state.

27. A non-transitory computer-readable medium storing computer-executable code for:

determining, at a user equipment (UE) that is operating in a CELL_FACH state, that the UE is in a soft handover region, wherein the UE operating in the CELL_FACH state is characterized by the UE having no dedicated physical channels;

monitoring a relative grant channel based on determining that the UE is in the soft handover region;

receiving a non-serving relative grant message from a non-serving neighbor cell; and adjusting one or more uplink transmission characteristics based upon the non-serving relative grant message.

28. The non-transitory computer-readable medium of claim 27, wherein the code for determining that the UE is in the soft handover region comprises code for determining that the UE is in a region in which the UE would be in soft handover if it was operating in a CELL_DCH state.

29. An apparatus for managing intercell interference, comprising:

at least one processor; and a memory coupled to the at least one processor, wherein the at least one processor is configured to execute processor-executable instructions stored on the memory that cause the processor to:

determine, at a user equipment (UE) that is operating in a CELL_FACH state, that the UE is in a soft handover region, wherein the UE operating in the CELL_FACH state is characterized by the UE having no dedicated physical channels;

monitor a relative grant channel based on determining that the UE is in the soft handover region;

receive a non-serving relative grant message on the relative grant channel from a non-serving neighbor cell; and adjust one or more uplink transmission characteristics based upon the non-serving relative grant message.

30. The apparatus of claim 29, and wherein the instructions that cause the processor to determine that the UE is in the soft handover region comprise instructions that cause the processor to determine that the UE is in a region in which the UE would be in soft handover if it was operating in a CELL_DCH state.

31. The method of claim 1, wherein the non-serving relative grant message instructs the UE to adjust a transmission rate of the UE.

32. The apparatus of claim 7, wherein the non-serving relative grant message instructs the UE to adjust a transmission rate of the UE.

33. The non-transitory computer-readable medium of claim 11, wherein the non-serving relative grant message instructs the UE to adjust a transmission rate of the UE.

34. The apparatus of claim 15, wherein the non-serving relative grant message instructs the UE to adjust a transmission rate of the UE.

35. The method of claim 21, wherein the one or more uplink transmission characteristics comprise a transmission rate.

36. The apparatus of claim 25, wherein the one or more uplink transmission characteristics comprise a transmission rate.

37. The non-transitory computer-readable medium of claim 27, wherein the one or more uplink transmission characteristics comprise a transmission rate.

38. The apparatus of claim 29, wherein the one or more uplink transmission characteristics comprise a transmission rate.

* * * * *